(12) United States Patent
Helnerus et al.

(10) Patent No.: US 10,252,619 B2
(45) Date of Patent: Apr. 9, 2019

(54) SAFETY MODULE AND CHARGING STATION PROVIDED WITH A SAFETY MODULE

(71) Applicants: Stefan Helnerus, Arnsberg (DE); Daniel Heßelmann, Dortmumd (DE); Sven Jundel, Dortmund (DE); Jürgen Waffner, Essen (DE)

(72) Inventors: Stefan Helnerus, Arnsberg (DE); Daniel Heßelmann, Dortmumd (DE); Sven Jundel, Dortmund (DE); Jürgen Waffner, Essen (DE)

(73) Assignee: innogy SE, Essen (DE)

( * ) Notice: Subject to any disclaimer, the term of this patent is extended or adjusted under 35 U.S.C. 154(b) by 0 days.

(21) Appl. No.: 16/011,035

(22) Filed: Jun. 18, 2018

(65) Prior Publication Data

US 2018/0297473 A1 Oct. 18, 2018

Related U.S. Application Data

(63) Continuation of application No. PCT/EP2016/075759, filed on Oct. 26, 2016.

(30) Foreign Application Priority Data

Dec. 18, 2015 (DE) .......................... 10 2015 122 217

(51) Int. Cl.
| | |
|---|---|
| *B60L 3/00* | (2006.01) |
| *H02J 7/00* | (2006.01) |
| *B60L 3/04* | (2006.01) |
| *B60L 3/12* | (2006.01) |
| *B60L 11/18* | (2006.01) |

(52) U.S. Cl.
CPC ............... *B60L 3/0092* (2013.01); *B60L 3/04* (2013.01); *B60L 3/12* (2013.01); *B60L 11/1816* (2013.01); *B60L 11/1824* (2013.01); *H02J 7/0027* (2013.01); *H02J 7/0029* (2013.01); *Y02T 10/7005* (2013.01); *Y02T 10/7055* (2013.01);

(Continued)

(58) Field of Classification Search
CPC ...... B60L 3/0092; H02J 7/0027; H02J 7/0029
USPC ......... 320/104, 109; 180/65.1, 65.21, 65.29; 701/22; 700/22; 702/60, 61, 63, 64, 65; 307/10.7
See application file for complete search history.

(56) References Cited

U.S. PATENT DOCUMENTS 8,278,875 B2 * 10/2012 Hagenmaier, Jr. .......................... B60L 11/1824 320/109
9,457,791 B2 * 10/2016 Vitale ................... B60L 3/0069
(Continued)

FOREIGN PATENT DOCUMENTS

| CA | 2 868 570 A1 | 10/2013 |
|---|---|---|
| CA | 3 008 938 A1 | 6/2017 |

(Continued)

*Primary Examiner* — Richard V Muralidar
(74) *Attorney, Agent, or Firm* — Reinhart Boerner Van Deuren P.C.

(57) ABSTRACT

Safety module for a charging station for electric vehicles having at least one processor, a sensor input, and a switching output. In order to be able to ensure the safety of a charging station independently of a charging process, the processor monitors at least one measured sensor value at the at least one sensor input independently of a charging process, and when the measured sensor value at the sensor input exceeds a triggering criterion, the processor outputs a switch-off signal at the switching output.

12 Claims, 2 Drawing Sheets

(52) U.S. Cl.
CPC .......... *Y02T 10/7072* (2013.01); *Y02T 90/121* (2013.01); *Y02T 90/14* (2013.01)

(56) References Cited

U.S. PATENT DOCUMENTS

| | | | |
|---|---|---|---|
| 9,796,280 B2* | 10/2017 | McCool | B60L 11/182 |
| 2010/0174667 A1 | 7/2010 | Vitale et al. | |
| 2011/0279082 A1 | 11/2011 | Hagenmaier, Jr. et al. | |
| 2011/0320056 A1 | 12/2011 | Brown et al. | |
| 2012/0140371 A1 | 6/2012 | Gaul et al. | |
| 2012/0286729 A1 | 11/2012 | Yegin et al. | |
| 2014/0211345 A1* | 7/2014 | Thompson | B60L 11/1816 361/42 |
| 2018/0056803 A1* | 3/2018 | Hell | B60L 3/0069 |
| 2018/0170204 A1* | 6/2018 | Hell | H04Q 9/00 |

FOREIGN PATENT DOCUMENTS

| | | |
|---|---|---|
| CN | 101 834 464 A | 9/2010 |
| DE | 29 36 279 A1 | 3/1980 |
| DE | 10 2009 034887 A1 | 2/2011 |
| DE | 20 2011 004515 U1 | 10/2011 |
| DE | 10 2011 007365 A1 | 10/2012 |
| DE | 10 2011 084362 A1 | 10/2012 |
| DE | 10 2011 075846 A1 | 11/2012 |
| DE | 10 2012 022455 A1 | 5/2014 |
| DE | 10 2013 200102 A1 | 7/2014 |
| DE | 10 2013 005507 A1 | 10/2014 |
| DE | 10 2013 219950 A1 | 4/2015 |
| DE | 20 2014 000328 U1 | 5/2015 |
| KR | 2013 0035498 A | 4/2013 |
| WO | WO 2013/020284 A1 | 2/2013 |
| WO | WO 2013/113400 A1 | 8/2013 |
| WO | WO 2017/102155 A1 | 6/2017 |

* cited by examiner

SAFETY MODULE AND CHARGING STATION PROVIDED WITH A SAFETY MODULE

CROSS-REFERENCE TO RELATED PATENT APPLICATIONS

This patent application is a continuation of PCT/EP2016/075759, filed Oct. 26, 2016, which claims priority to German Application No. 10 2015 122 217.5, filed Dec. 18, 2015, the entire teachings and disclosure of which are incorporated herein by reference thereto.

FIELD OF THE DISCLOSURE

The subject matter relates to a safety module for a charging station for electric vehicles and a charging station for electric vehicles provided with a safety module.

BACKGROUND OF THE DISCLOSURE

There is an increasing proliferation of electric charging stations for electric vehicles. Electric vehicles within the meaning of this subject matter can, by way of example, be purely electrically operated vehicles or what are known as plug-in hybrid vehicles, both of which have a battery which can be electrically charged. Charging stations are generally positioned in public and semi-public areas, in order to be available to the general public. In the expansion of the charging stations infrastructure, the safety of such charging stations is of increasing relevance. Both with direct current (DC) and alternating current (AC) charging, electrotechnical safety aspects must be considered. Non-hazardous operation of the charging stations must always be ensured. It must in particular be ensured that the user is protected from an electric shock harmful to health.

To this end, conventionally what are known as fault current switches have been provided in charging stations. Monitoring of an ground fault may be provided for as an alternative or in addition. These protective circuits prevent a user who comes into contact with live components of the charging station suffering from an electric shock harmful to health. Here the safety switches ensure that in the event of an ground fault and/or a fault current, the electrical line is interrupted.

In the event of a short circuit also, that is to say at high currents, the charging station must be able to switch off. For this purpose, so-called contactors are provided which even under high load can safely switch off a current. With the help of the contactors the mains connection of the charging station is isolated from the other electronics within the charging station.

Apart from the stated safety aspects, further safety-related devices can be provided in charging stations, which monitor the electrical functions of the charging station and in the event of a fault either isolate the electrical line themselves or output a corresponding isolation pulse.

In known charging stations, however, the respective safety-related devices are operated autonomously and independently of one another. This means that no higher-level monitoring of the functioning of the individual safety elements exists. As a result, there are safety risks in the event of a malfunction of individual safety elements.

BRIEF SUMMARY OF THE DISCLOSURE

For this reason, the problem for the subject matter was to increase the electrical safety of charging stations for electric vehicles.

This problem is solved by embodiments of a safety module as disclosed herein and of a charging station as disclosed herein.

According to the subject-matter, it has been identified that with the help of an autonomous safety module working independently of the charging process, the functionality of the individual safety devices in the charging station can be monitored and in the event of a malfunction measures can be taken to guarantee continued safety. To this end the safety module has a processor. The processor can be programmed to process measured sensor values. With the help of the processor it is possible, according to pre-programmed rules, to initiate actions, which are preferably dependent upon the measured sensor values at, at least, one respective sensor input.

To be able to initiate actions, the safety module has at least one switching output. Via the switching output the safety module can output a switching pulse, with the help of which the electrical connection of the charging station can be isolated from the supply network. An electrical connection of the connector socket of the charging station for a charging cable can also be isolated from the other electronics of the charging station. This isolation can take place within the charging station. With the help of corresponding isolation switches an isolation can also be achieved at other positions.

The measured sensor values at the sensor input are fed to the processor and depending on a processing, a switching instruction is issued at a switching output. For this reason, the sensor input and the switching output have an operative connection with the processor.

To be able to guarantee non-hazardous operation of the charging station, it is now proposed that the processor works independently of a charging process. This means that independently of the current flows during a charging process, the processor monitors the safety-related functions in the charging station. To this end the sensor preferably monitors a measured sensor value at the at least one sensor input.

Measured sensor values can also originate from various sensors within the charging station. Such sensors are preferably also provided on the safety-related devices, such as for example a fault current switch, contactor, main switch or similar. Sensors can also be provided independently of safety-related devices, by way of example for direct current fault detection and/or for alternating current fault detection. A Rogowski coil acting as a sensor can also, by way of example, deliver a measured sensor value.

The processor monitors at least one measured sensor value independently of the charging process, so that independently of the charging process when the at least one measured sensor value at the sensor input exceeds a triggering criterion a switch-off signal can be output at the sensor output. With the help of the switching command or switch-off signal at the switching output it is possible to switch off various functions of the charging station. Such a switch-off signal can, by way of example, be a message transmitted via a power line or a pilot wire to a vehicle electrically connected to the charging station. In the vehicle this signal can be received by a charging controller and immediately following receipt of such switch-off signal shut-off the charging process. In this case, by means of the charging controller in the vehicle the current flow between the charging station and the electric vehicle via the charging cable is shut-off.

If a fault current is detected, be this by a fault current switch itself or by a sensor arranged on the power lines, for example by way of a Rogowski coil or similar, a circuit breaker can be tripped by the switch-off signal and isolate the connection between the charging socket of the charging station and the upstream electronics within the charging station as well as the mains connection.

It is also possible for a contactor to be tripped which in response to receipt of a switch-off signal causes an isolation of the mains connection of the charging station from the downstream electronics within the charging station.

Finally, a switch-off signal can also trip a system-protective circuit breaker, which is preferably a mechanical switch, with which even under load the complete charging station can be isolated from the power supply system. Thus, the switching output has at least one, preferably a plurality of switching lines to various switch-off devices within the charging station. Depending on the switch-off signal, optionally one or more of these switching lines can be tripped, in order to cause a corresponding switching off of the respective switch-off device. A system-protective circuit breaker can be provided in addition to a contactor as electrical protection.

By means of the independent monitoring of the measured sensor values, in the safety module, various errors can be detected independently of one another. Thus, in the safety module, it is possible in the first instance to detect if the individual safety-related components are functioning without errors. By way of example, a conventional contactor has internal functional monitoring, which can output a measured sensor value galvanically decoupled from the actual power line. In the event of malfunction of a contactor therefore, a corresponding measured sensor value can be fed to the processor via the sensor input and if necessary a system protection activated.

The function of a circuit breaker can also be checked, to which end by way of example a suitable sensor is arranged on the circuit breaker. Such a sensor can also feed a measured sensor value, preferably galvanically decoupled from the energy line, via the sensor input to the processor. Depending on the measured sensor value, the processor can transmit switch-off signals preferably, by way of example, to the contactor.

Fault currents can also be monitored independently of the functionality of the circuit breaker, by way of example by means of suitable coils or other sensors, by way of example Hall sensors, on the power lines and in the event of a fault a contactor or a circuit breaker can be opened with the help of the switch-off signal.

With the help of the safety module according to the subject matter, it is possible to check various safety elements within a charging station. Safety aspects can be handled by the individual components themselves or by the safety module.

According to an embodiment, it is proposed that the processor checks the sensor input immediately prior to a charging process. Before a charging process takes place, by way of example at the moment when a vehicle signals to a charging station its readiness for charging or in the charging station the charging current is to be switched on, a check of the safety-related functions can take place first. To this end, the safety module, with the help of its processor, can check measured sensor values at the sensor input. This check of the measured sensor values means that the processor checks whether one of the measured sensor values meets a triggering criterion and if so the charging process can be prevented even before it has begun. This means that no charging current at all reaches the charging cable and in the event of operator error even contact with the charging cable does not lead to an electric flashover.

According to an embodiment, it is proposed that the sensor input is configured for receipt of a plurality of measured sensor values. The sensor input can be understood as a generic term for a plurality of terminals or connections operated independently of one another. At these terminals or connectors, depending on the measured sensor value, various electronic modules can be arranged for evaluating the signals. The sensor input can also be a digital input, receiving digital measured sensor values from a number of sensors. By suitable parameterisation of the sensor input, the data from various sensors, containing the measured sensor values, can be fed to the processor in a suitable manner.

According to an embodiment, it is proposed that the sensor input for receiving a measured sensor value of a sensor is arranged on a contactor. Modern-day contactors have monitoring devices, which monitor the switching capability of the contactor. These monitoring devices can have an output galvanically isolated from the actual switch, on which a measured sensor value can be output. As an example of a galvanic decoupling, the sensor can first monitor the switching capability within the contactor and determine the state of the contactor via an optical coupler on an output. In this way, a galvanic decoupling between output and the component monitored, here the contactor, is achieved. The measured sensor value is present in either analogue or digital form on the output. In this connection, reference is made to the fact that the measured sensor value can always be present in either analogue or digital form. The sensor input can be configured depending on the type of measured sensor value. It is, in particular, possible that on the sensor input both connections and terminals for digitally encoded measured sensor values and for analogue measured sensor values are present.

According to an embodiment, it is also proposed that the sensor input is configured for receiving a measured sensor value of a current sensor, in particular of a direct current sensor. For monitoring fault currents, by way of example type A and type B fault current switches can be provided. Type B fault current switches can, in particular, be configured to detect a direct current fault. It is also possible, however, to arrange a direct current fault by arranging a suitable sensor directly on the line or the lines through which the charging current flows. By way of example, by means of a coil, in particular a Rogowski coil, a direct current fault on a cable section, through which the charging current flows, can be detected.

According to an embodiment, it is proposed that the sensor input is configured for receiving a measured sensor value of a temperature sensor.

Temperature sensors can, on the one hand, be provided for measuring the temperature within the charging station as a whole, and also directly on individual modules within the charging station. By including the measured temperature, the processor can monitor the triggering criteria depending on temperature. Here, by way of example, triggering curves can be monitored depending on the temperature. The temperature can also be checked against a triggering criterion.

It has also been realised that the position of the charging station can be relevant. For this reason, a position sensor is provided which makes its measured sensor value available to the sensor input.

Various requirements may make it necessary for different triggering curves or triggering criteria to be provided for the same measured sensor value. The appropriate triggering criterion or the appropriate curve can then be used depending on the requirement. It can also be determined, as required, which measured sensor values are to actually be monitored and are able to bring about a triggering of a switch-off signal at the switching output. In particular, due to legal requirements these may be highly different triggering criteria and/or measured sensor values, which are classed as being safety-related.

With the help of the position sensor, in the processor a geographical position of the charging station can be determined and depending on the position, from a set of various triggering criteria/curves one that is suitable for a measured sensor value or a geographical region, respectively, can be selected. From a set of requirements, it is also possible to select the one that determines which measured sensor values are actually to be monitored. Thus, the safety module can, for example, be used trans-nationally, without reprogramming being necessary. On the contrary, by using the measured sensor value, the safety module can automatically determine the appropriate triggering curves/criteria and measured sensor values.

According to an embodiment, it is proposed that in the safety module, in particular in a memory module of the safety module, for each of the measured sensor values at least one triggering curve and/or a triggering criterion is stored. As already mentioned, various requirements may be present relating to a variety of safety aspects. Depending on the requirement, with the help of the processor, the respective relevant triggering curve and/or the respective relevant triggering criterion can be used.

It can also be identified in the safety module that a measured sensor value is compared by the processor with a triggering curve and/or a triggering criterion selected in each case.

It is also possible that in the safety module, as mentioned, various sets of information on measured sensor values to be evaluated are present and this information, which is stored in a memory module, can be selected depending on the situation. Thus, it is possible, by way of example, that the measured sensor values to be measured before a charging process differ from the measured sensor values during a charging process. If a charging process has not yet started, it may be appropriate to monitor measured sensor values that differ from those during a charging process. Here the respective sets of measured sensor values to be measured may overlap, but they do not have to be identical. Thus, depending on the state of the charging station, the processor can read from the memory the information on the set of measured sensor values with the respective triggering criteria to be monitored.

According to an embodiment, it is proposed that the switching output is connected with at least two switches that are independent of one another, wherein each of the switches is configured to electrically isolate a mains connection from charging electronics. Depending on the measured sensor values evaluated, it may be necessary to switch respectively one of at least two different switches. In particular, depending on the position of the fault detected in the cable path within the charging station, switching off at various positions may be necessary. In particular, it is recognised that a first switch is a contactor between the mains connection and the charging electronics and that a second switch is a system-protective circuit breaker of a system contactor. By way of example, it can be identified when a fault current circuit breaker is defective. A measured sensor value that is relevant here can be evaluated in the processor. If the processor identifies such a fault, by way of example a first switch, by way of example a contactor, can be opened with the help of the switch-off signal.

It can also, by way of example, be identified that the contactor is defective, by way of example that the contacts of the contactor have jammed or stuck together. The contactor can then no longer switch. In order to prevent a fault, it may be necessary to open a mechanical system protection which, starting from the mains connection is provided before the contactor, with the help of the switch-off signal.

According to an embodiment, it is proposed that the processor, depending on at least one measured sensor value, determines the switch to be switched. To this end, the processor can access a logic stored in a memory module. This logic can store which switch is to be switched for which fault or upon reaching which triggering criterion of which measured sensor value. Depending on this logic, the processor can then determine that a switch-off signal is sent for the respectively determined switch.

According to an embodiment, it is proposed that the processor as a function of a position of the safety module selects at least one of a plurality of saved triggering criteria and/or triggering curves. As already explained, various requirements for safety-related functions may exist. Depending on the requirement, a different triggering criterion or a different triggering curve may then be relevant. Selecting which triggering criterion or which triggering curve is relevant, can be dependent on the position of the safety module. In particular, therefore, country-specific requirements can be met, without the charging station having to be adapted for a respective country. The adaptation is automatic, as a function of the detected position of the safety module. Detection of the position can take place by the position sensor, which provides a measured sensor value representative of the position via the sensor input to the safety module.

As already mentioned, the safety module is preferably independent of the charging process. The safety module works not just independently of the logic of the charging process but is preferably also electrically independently of the charging electronics. To this end, it is proposed that the sensor input and/or the sensor output are galvanically isolated from the electronics. Galvanic isolation of the sensor input and/or output from the charging electronics ensures that the safety module is electrically isolated from the charging electronics and a fault in the charging electronics does not cause a fault in the safety module.

According to an exemplary embodiment, it is proposed that the processor performs a self-test immediately before a charging process. Such a self-test can, by way of example, involve the processor checking the software stored in the memory module and checking if the correct software has been loaded. Fault logs can also be read to determine if a fault has been recorded previously. Furthermore, measured value ranges of the measured sensor values can be captured and evaluated. With the help of the self-test, the safety module is able to ensure that it is configured for and capable of the safety check of the charging station.

The self-test can also serve, via the sensor input, to exchange test signals with the respective sensors, to ensure the functional capability of the sensors. With the help of test signals, via the switching output, a switching capability of a respective switch can also be checked. In particular, test routines already present in the switch can be invoked. In particular, for example stuck switches can be identified. If a contactor opens, all phases must for example be opened. By checking the conductivity in the opened state across all phases a switch which has stuck and is thus still closed can for example be detected, since across this the contact resistance, unlike the other switches, will be below a limiting value. If a fault is identified during the self-test, then at least one of the switches is opened.

According to an embodiment, it is proposed that in the event of a negative self-test of the processor a control signal is transmitted to prevent the charging process. Such a control signal can, by way of example, be transmitted via the charging electronics to the electric vehicle. In the electric vehicle, the starting of a charging process can then be prevented by the charging controller.

According to an embodiment, it is proposed that the safety module has a plug-in module for connection to charging control electronics. Thus, the plug-in module can be connected modularly to the charging control electronics within the charging station. It should be noted here, however, that preferably a galvanic decoupling of the safety module from the control electronics within the charging control electronics continues to be ensured.

According to an embodiment, it is proposed that a receiver module at least for receiving triggering criteria and/or triggering curves is provided. The safety module is thus controllable and parameterisable from outside. In particular, via the receiver module changed triggering criteria and curves can be fed into the safety module from outside.

A further aspect is a charging station for electric vehicles. This charging station has a mains connection, with which the charging station can be connected to the network of an energy provider. Starting from the mains connection, first a system-protective circuit breaker is provided for in the charging station. After the system-protective circuit breaker a contactor is provided and then after the contactor the charging control electronics can be provided. The charging control electronics can be safeguarded via a fault current circuit breaker. On the output side of the charging control electronics a connection socket for a charging cable can be provided. In the charging station a safety module as described above is provided, with which safety-relevant individual aspects can be checked in a standardised module. Here, the safety module is preferably provided in its own encapsulated housing and thus independently of the charging control electronics.

BRIEF DESCRIPTION OF THE SEVERAL VIEWS OF THE DRAWING

In the following, the subject-matter is explained in further detail using a drawing showing embodiments. In the drawing shows.

DETAILED DESCRIPTION

Figure 1:
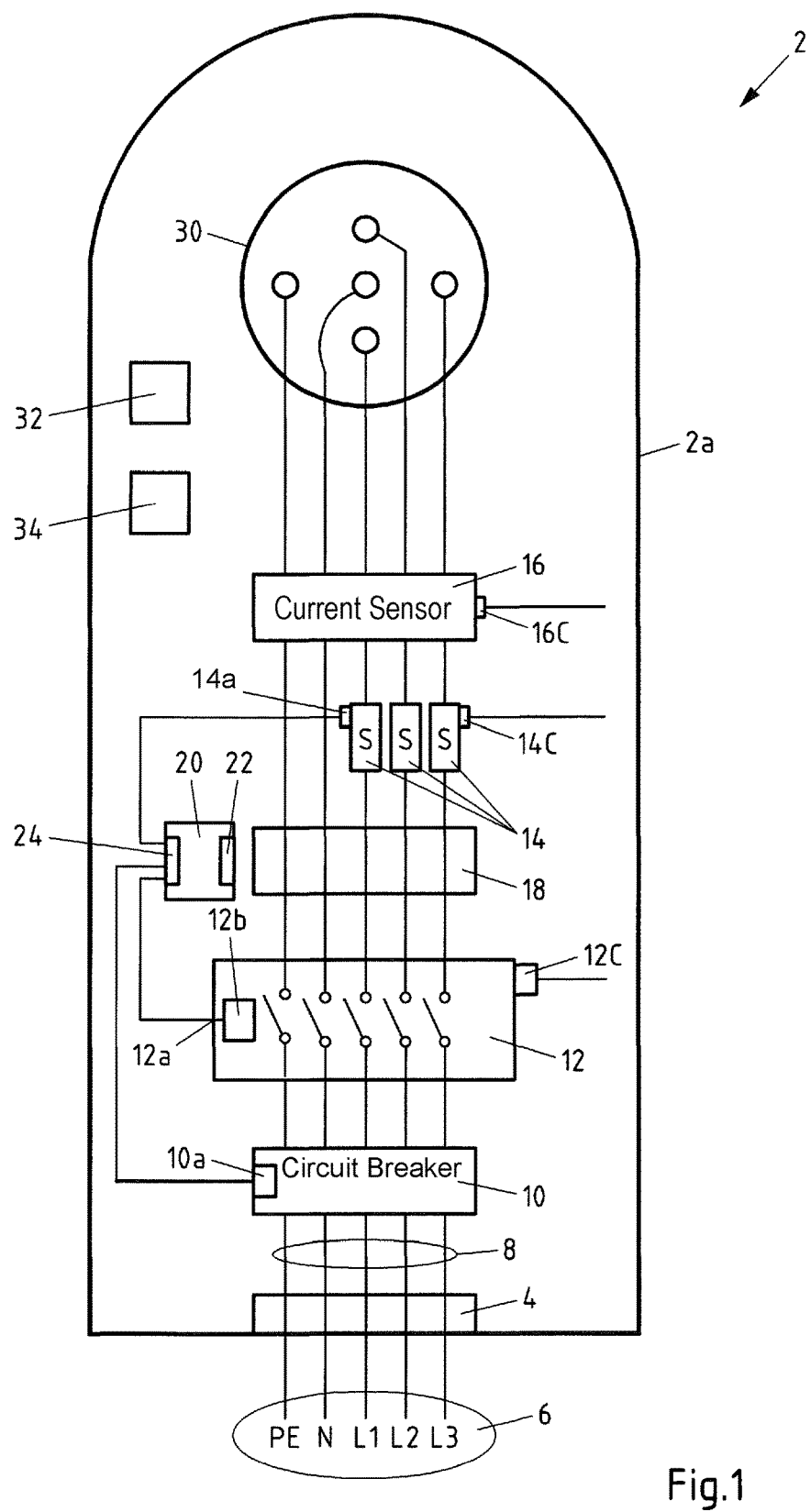
FIG. 1 is a schematic view of a charging station for electric vehicles with a safety module according to the subject matter.

FIG. 1 shows a charging station 2. The charging station 2 has a housing 2a. In the housing 2a of the charging station 2 a mains connection 4 is provided. Via the mains connection 4 the charging station 2 can be connected to a power supply system 6. The energy supply network 6 can have various designs. Thus, the power supply system can, by way of example, be a 50 Hz network or a 60 Hz network. The number of phases of the power supply system can also differ, as can the voltage which can be 110V, 230V or also another voltage. The mains connection 4 shown is a three-phase connection with three phases L1, L2, L3, a neutral conductor N and an earthing conductor PE. These can be fed together as power lines 8 into the charging station 2.

Initially the power lines 8 are fed to a system-protective circuit breaker 10. The system-protective circuit breaker 10 is a mechanical switch, which also under full load, e.g. also at high currents, is able to isolate the mains connection 4 from the rest of the charging electronics within the charging station 2. The system-protective circuit breaker 10 has a switching input 10a.

Various electrical elements can be connected to the system-protective circuit breaker 10 which are not safety-related. In the following illustration only the electric and electronic modules of the charging station that are relevant to the subject matter are mentioned and shown. For the sake of clarity, representation of the charging station 2 in full detail has been dispensed with. Instead, the focus is on those aspects that are relevant to the subject matter. This means that between the two modules shown, further modules can always exist, that may be relevant for the charging process. Leaving these out does not mean, however, that the subject matter does not relate to these modules.

Starting from the system-protective circuit breaker 10 a contactor 12 is provided. The contactor 12 has at least for all power lines 8 a main current switch, which is activated by a switching mechanism 12b. The contactor 12 is preferably dual closing or dual opening. The contactor 12 can be controlled via a switching input 12a. Operational monitoring of the contactor 12 can take place via a suitable sensor. In doing so, by way of example, sticking of a contact can be identified. This can, by way of example, take place by measurement of a through contact across all NC contacts with NC contacts open, since on the contactor 12 all switches should have the same state only. The state of the contactor 12 is captured by a sensor, which outputs this as a measured sensor value via a sensor output 12c.

Next, on the contactor 12, by way of example for each phase L1-L3, a fuse or fault current fuse, in particular a fault current switch 14 can be provided. The respective fault current switches 14 can have a sensor, which monitors the functional capability of the fault current switch 14 and outputs this at a sensor output 14c.

Each fault current switch 14 can also have a switching input 14a. Via the switching input 14a, each of the fault current switches 14 can be separately controlled and tripped, so that the associated electrical cable is opened.

The fault current switches 14 can also be conventional fuses.

For the monitoring of a fault current, in particular a direct current fault current, the power lines 8 can by way of example be connected to a current sensor. Rogowski coils or other current meters can also be provided. These are shown in FIG. 1 as current sensors 16. The current sensors 16 have a sensor output 16c.

Charging electronics 18, not shown in more detail, can be provided, for controlling a charging process with an electric vehicle. The way charging control electronics 18 work is well known and is not explained in more detail. A safety module 20 according to the subject matter can be connected to the charging control electronics 18. The safety module 20 can, however, also be separate from the charging control electronics.

Figure 2:
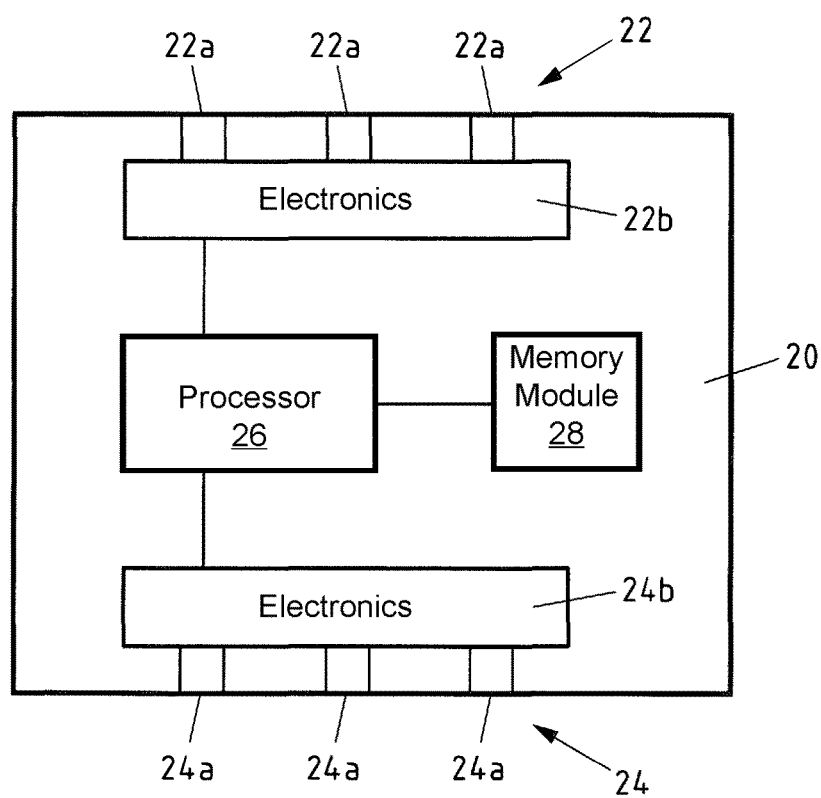
FIG. 2 is a schematic view of a safety module.

As shown in FIG. 2, the safety module 20 has a sensor input 22 with a plurality of sensor terminals 22a. The safety module 20 also has a switching output 22 with a plurality of output terminals 24a.

The input terminals 22a and the output terminals 24a are switched via respective electronics 22b, 24b and preferably digitally connected to a processor 26. The processor 26, for its part, is connected to a memory module 28.

As can be seen in FIG. 1, switching inputs 10a, 12a, 14a are applied to the switching output 24 of the safety module 20.

Furthermore, the sensor outputs 12c, 14c and 16c are applied to the sensor input 22, which for the sake of clarity is not shown in more detail in FIG. 1.

On the output side of the current sensor 16 the power lines 8 are connected with the connection socket 30 or the contacts fitted therein.

During operation of the charging station 2, the safety module 20 is generally always active.

The safety module 20, with the help of the processor 26, checks the measured sensor values applied to the sensor inputs 22a by evaluating the measured value data provided by the electronics 22b.

Besides from the measured sensor values shown, further measured sensor values from, by way of example, a temperature sensor 32 or a position sensor 34, by way of example a GPS sensor or a Galileo sensor, can be made available.

To begin with the safety module 20 or the processor 26 reads out position information from the sensor 34. Depending on the identified position, the processor 26 can read from the memory module 28 a set of triggering criteria or selection curves as well as information on the set of measured sensor values to be evaluated. For different geographical positions different sets of selection criteria and measured sensor values to be evaluated can be stored in the memory module 28.

The safety module 20 then receives from the charging electronics 18 by way of example the information that a charging process is to begin. The safety module 20 thereupon retrieves the specified measured sensor values via the sensor inputs 22a. The retrieved measured sensor values are compared with the loaded triggering criteria or triggering curves. If a triggering criterion is met, then via the switching output 24 at least one switching command for the switches 10, 12, 14 is output.

The switch for which the switching signal is output is, by way of example, also dependent upon which triggering criterion has been met. It is generally advantageous if the switch that is opened in each case is the one immediately upstream of the detected fault. This means that if a direct current fault is detected on sensor 16, switches 14 are opened. If a fault is detected on the switches 14, the contactor 12 can be opened and if a fault is detected in the contactor 12, the system protection 10 can be activated. This switching of one or more switches depending on the detected measured sensor values or the meeting of the triggering criterion can similarly be stored in the memory module 28.

If the safety module 22 does not identify any fault, then the charging process can continue. This can either takes place by the safety module 20 giving a corresponding indication to the charging electronics 18, or by the charging electronics 18 continuing the charging process independently of the safety module 20. The continued charging process would then be automatically interrupted by the safety module 20 if a fault were identified.

Furthermore, the safety module 20 can perform a self-test, by automatically checking measured sensor values and functions. This can take place by retrieving measured sensor values via the sensor inputs 22a and switching states via the switching outputs 24a. Depending on whether the self-test is successful or not, the safety module 22, independently of a charging process, can deactivate the charging station 2 by opening at least one of the switches 10, 12, 14.

With the help of the safety module according to the subject matter, it is possible to monitor safety-critical elements in a charging station independently of a charging process. It is also possible to adaptively comply with various rules regarding individual safety aspects, without having to adapt the charging station 2 individually to the respective rules.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A safety module for a charging station for electric vehicles, comprising:
   a processor,
   at least one sensor input, and
   at least one switching output, wherein
   the sensor input and the switching output have an operative connection with the processor, wherein,
   in the safety module for each sensor measured value at least one triggering curve and/or one triggering criterion is stored
   the processor monitors at least one measured sensor value at the at least one sensor input independently of a charging process
   the processor compares a sensor measured value with an appropriate triggering curve and/or a triggering criterion and when the measured sensor value at the sensor input exceeds a triggering criterion the processor outputs a switch-off signal at the switching output the processor reads a geographical position of the charging station from a position sensor provided within the charging station, and the processor selects at least one of a plurality of stored triggering criteria and/or triggering curves as a function of a position of the safety module.

2. The safety module according to claim 1, wherein the processor checks the sensor input immediately before a charging process.

3. The safety module according to claim 1, wherein the sensor input is configured to receive a plurality of measured sensor values.

4. The safety module according to claim 1, wherein the sensor input is configured to receive a measured sensor value of a sensor on a contactor and/or in that the sensor input is configured to receive a sensor measured value of a current sensor, in particular of a direct current sensor, and/or in that the sensor input is configured to receive a sensor measured value of a temperature sensor, and/or in that the sensor input is configured to receive a sensor measured value of a position sensor.

5. The safety module according to claim 1, wherein the switching output is connected with at least two switches that are independent of one another, wherein each of the switches is configured to electrically isolate a mains connection from the charging electronics, in particular in that a first switch is a contactor between the mains connection and the charging electronics and in that a second switch is a system-protective circuit breaker.

6. The safety module according to claim 5, wherein the processor determines the switch to be switched depending on at least one sensor measured value.

7. The safety module according to claim 1, wherein the sensor input is galvanically isolated from charging electronics and/or in that the sensor output is galvanically isolated from the charging electronics.

8. The safety module according to claim 7, wherein a plug-in module is provided for a connection to the charging electronics.

9. The safety module according to claim 1, wherein immediately before a charging process the processor performs a self-test, in particular in that the processor exchanges test signals via the sensor input with the respective sensors and/or in that the processor checks a switching capability of a respective switch via the switching output.

10. The safety module according to claim 9, wherein in the event of a negative self-test of the processor a control signal is transmitted to prevent the charging process.

11. The safety module according to claim 1, wherein a receiver module is provided for receiving triggering criteria and/or triggering curves.

12. A charging station for electric vehicles, comprising:
a mains connection,
a system-protective circuit breaker connected at the mains connection,
a contactor connected to the system-protective circuit breaker,
charging control electronics connected to the contactor, and
a safety module according to claim 1.

* * * * *